(12) United States Patent
Inaba et al.

(10) Patent No.: US 6,855,904 B2
(45) Date of Patent: Feb. 15, 2005

(54) WIRE ELECTRIC DISCHARGE MACHINING APPARATUS

(75) Inventors: Yoshiharu Inaba, Kawasaki (JP); Yushi Takayama, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/765,908

(22) Filed: Jan. 29, 2004

(65) Prior Publication Data

US 2004/0182825 A1 Sep. 23, 2004

(30) Foreign Application Priority Data

Jan. 29, 2003 (JP) ........................................ 2003-020174

(51) Int. Cl.[7] .................................................. B23H 7/10
(52) U.S. Cl. .................................................. 219/69.12
(58) Field of Search ........................ 219/69.12, 137.61

(56) References Cited

U.S. PATENT DOCUMENTS

| | | | | |
|---|---|---|---|---|
| 4,733,038 A | * | 3/1988 | Girardin ................... | 219/69.12 |
| 5,268,552 A | * | 12/1993 | Onzuka et al. ........... | 219/69.12 |
| 5,384,444 A | * | 1/1995 | Truty et al. .............. | 219/69.12 |

FOREIGN PATENT DOCUMENTS

| | | | | |
|---|---|---|---|---|
| JP | 61-182731 | | 8/1986 | |
| JP | 63-221926 | | 9/1988 | |
| JP | 4-93117 A | * | 3/1992 | ............. 219/69.12 |
| JP | 4-42420 | | 2/1993 | |
| JP | 5-92320 | | 4/1993 | |
| JP | 8-019920 | | 1/1996 | |
| JP | 8-141845 A | * | 6/1996 | |
| JP | 2001-232520 | | 8/2001 | |

OTHER PUBLICATIONS

Patent Abstracts of Japan of Publication No. 62152618 published Jul. 7, 1987.

* cited by examiner

*Primary Examiner*—Geoffrey S. Evans
(74) *Attorney, Agent, or Firm*—Staas & Halsey LLP

(57) ABSTRACT

A wire electric discharge machining apparatus having a structure for supplying power to a wire electrode which prolongs the life of a power supply element and reduces manufacturing and running costs. A guide roller is driven by a small motor through a lead screw and guides the wire electrode above and/or below the power supply element, formed as a flat plate and driven in an oscillating direction perpendicular to a running direction of the wire electrode and parallel to a flat surface of the power supply element. A contact position of the wire electrode on the power supply element is varied over an area of a wide range, avoiding creation of a groove or the like, attributable to friction, in the power supply element and extending the life thereof.

2 Claims, 4 Drawing Sheets

FIG.5a  FIG.5b  FIG.5c  FIG.5d
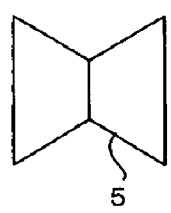 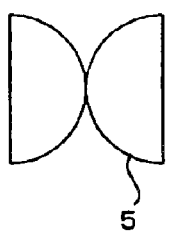 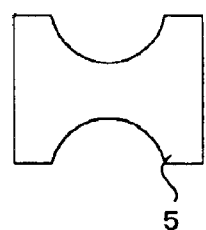 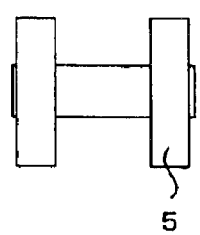
FIG.6a  FIG.6b
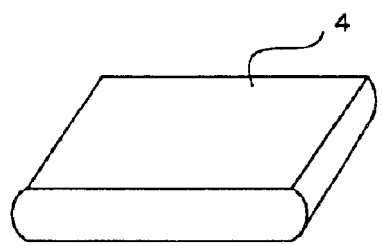 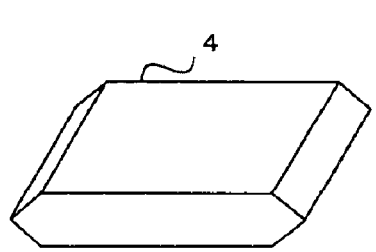
FIG.6c
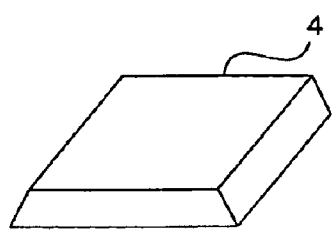

WIRE ELECTRIC DISCHARGE MACHINING APPARATUS

BACKGROUND OF THE INVENTION

1. Field of the Invention

The present invention relates to a wire electric discharge machining apparatus, and more specifically to a mechanism for supplying electric power to a wire electrode of the wire electric discharge machining apparatus.

2. Description of Related Art

A wire electric discharge machining apparatus applies voltage between a wire electrode and a workpiece, and generates an electric discharge between the wire electrode and the workpiece to thereby carry out the machining. Therefore, the wire electric discharge machining apparatus has a power supply element brought into contact with the wire electrode to supply power thereto. However, the wire electrode runs during the machining, so that the power supply element is abraded at a contact point with the wire electrode, thus forming a groove or the like if the contact position is fixed. This makes the contact conduct insufficient, and the desired voltage cannot be provided to between the wire electrode and the workpiece.

In order to solve this problem, a well-known wire electric discharge machining apparatus is configured to rotate a power supply element so that the contact position of a wire electrode on a power supply element is not fixed and to move the power supply element straightforward in a direction perpendicular to the running direction of the wire electrode to vary the contact position of the wire electrode on the power supply element, thereby lengthening the life of the power supply element (see JP 8-19920A, JP 2001-232520A and JP 2552851B, for example).

There is another well-known wire electric discharge machining apparatus, which is provided with a power supply element between the first and second electrode guides, and drives the second electrode guide to vary the contact position of the power supply element on a wire electrode, thereby extending the life of the power supply element (see JP 2671663B, for example).

In the process of changing the contact position of the wire electrode on the power supply element by moving the power supply element, the application of voltage to the power supply element generates a secondary abrasion due to an electrical phenomenon, such as a small discharge, on sliding surfaces of the power supply element and a supporting portion. As a measure against the secondary abrasion, it is possible to conceive of the idea that the supporting portion for supporting the power supply element can be formed into an insulating structure. This measure, however, would cost more accordingly.

On the other hand, in the process of changing the contact position of the wire electrode on the power supply element by moving the electrode guide, the wire electrode is supported by the electrode guide at a wide angle since the electrode guide is moved. Thus, the wire electrode runs while generating a large abrasion against the electrode guide, and the electrode guide is therefore abraded soon. As a result, it is required to frequently exchange the electrode guide for a new one. Furthermore, the mechanism for changing the position of the electrode guide becomes complicated and thus costly.

SUMMARY OF THE INVENTION

The present invention provides a wire electric discharge machining apparatus capable of prolonging a life of a power supply element and reducing a manufacturing cost and a running cost with simple structure.

A wire electric discharge machining apparatus of the present invention comprises: a power supply element for supplying voltage to a wire electrode by contact with the wire electrode; a guide roller for supporting the wire electrode arranged at one side of the power supply element with respect to a running direction of the wire electrode; and a guide roller moving mechanism for moving the guide roller in a direction substantially perpendicular to the running direction of the wire electrode so that position of the contact of the power supply element with the wire electrode is changed.

Guide rollers for supporting the wire electrode may be provided to be respectively arranged at both sides of the power supply element with respect to the running direction of the wire electrode, and at least one guide roller moving mechanism may be provided for moving the guide rollers in a direction substantially perpendicular to the running direction of the wire electrode so that position of the contact of the power supply element with the wire electrode is changed.

BRIEF DESCRIPTION OF THE DRAWINGS

FIGS. 5a–5d are schematic diagrams showing shapes of guide rollers for use in each embodiment;

FIGS. 6a–6c are schematic diagram showing shapes of power supply elements for use in each embodiment;

DETAILED DESCRIPTION

Figure 1:
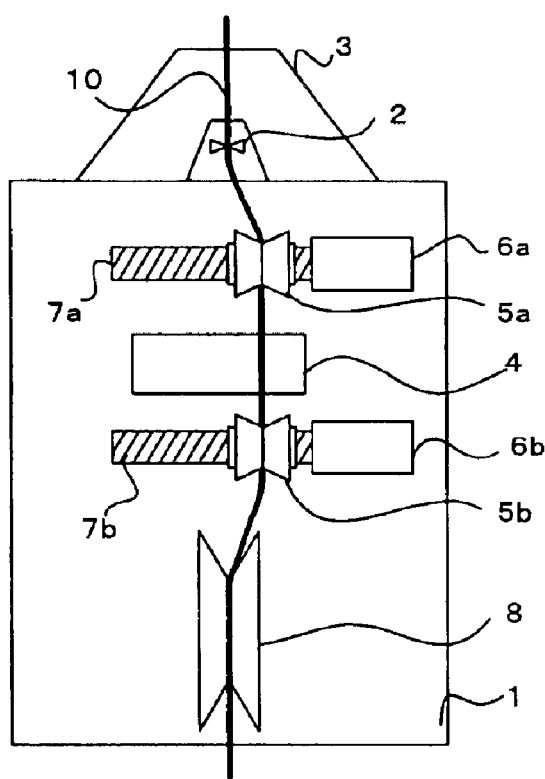
FIG. 1 is a schematic diagram showing a lower wire guide portion of a wire electric discharge machining apparatus according to a first embodiment of the present invention.

FIG. 1 is a block diagram schematically showing a lower wire guide portion according to one embodiment of the present invention. Reference numeral 1 denotes a lower guide block. At a tip end of the lower guide block 1, there is disposed a wire guide 2 and a machining fluid nozzle 3 for supplying a machining fluid to a discharge machining area. In the lower guide block 1, there is provided a power supply element 4 having a flat surface in contact with a wire electrode 10 and supplying power to the wire electrode 10. Guide rollers 5a and 5b and guide roller movement mechanisms for moving the guide rollers 5a and 5b are arranged at both sides of the power supply element 4, i.e., above and below the power supply element 4 (in front and in the rear of the power supply element 4 along a running direction of the wire electrode 10) in this embodiment. The guide roller movement mechanisms are configured to move the guide rollers 5a and 5b in a direction perpendicular to the running direction of the wire electrode 10 and at the same time in a direction parallel to a contact surface of the power supply element 4 with respect to the wire electrode 10 by way of lead screws 7a and 7b driven by respective small motors 6a and 6b. Additionally, reference numeral 8 represents a lower guide roller.

Figure 2:
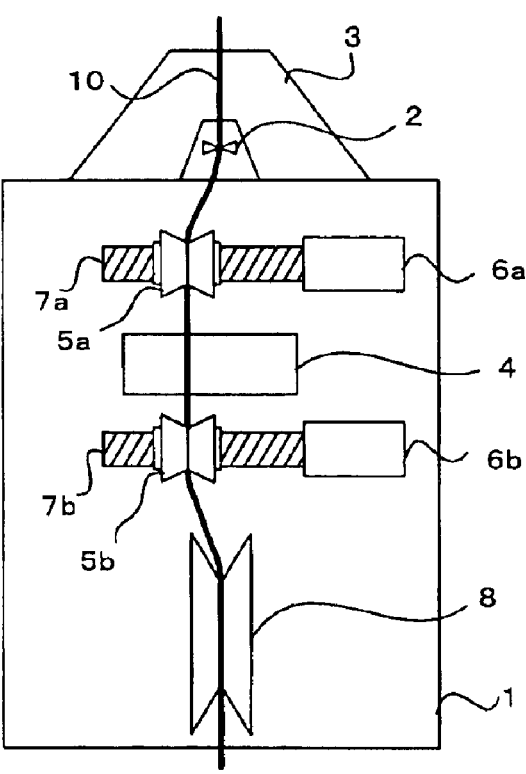
FIG. 2 is a schematic diagram showing a state in which upper and lower wire guides are moved to vary a position of contact of a wire electrode with a power supply element in the embodiment shown in FIG. 1.
Figure 7:
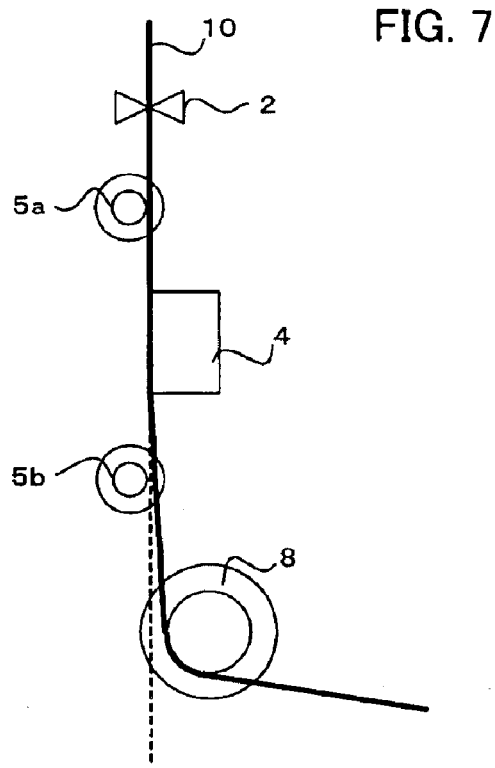
FIG. 7 is a schematic diagram showing positional relation of the upper and lower wire guides and the power supply element with respect to the wire electrode.

The wire electrode 10, as illustrated in FIG. 7, is guided by the lower guide roller 8 and the right side of the movable lower-side guide roller 5b in FIG. 7 (lower side in a perpendicular direction facing into the drawings of FIGS. 1 and 2). The wire electrode 10 is brought into contact to a contact surface of the power supply element 4, or left-side surface thereof in FIG. 7, guided by the right-side surface of the movable upper-side guide roller 5a in FIG. 7, and guided by a wire guide 2 to be led out of a nozzle opening of the machining fluid nozzle 3, thereby passing a machining area in which a workpiece is machined and being directed to an upper guide block, not shown. Thus, the wire electrode 10 is guided while being pushed against the contact surface of the power supply element 4 by the upper-side and lower-side guide rollers 5a and 5b. The upper guide block may have the same construction as the lower guide block shown in FIG. 1. Also, the power supply element 4 for supplying voltage to the wire electrode 10 may be disposed at one place. Therefore, the upper guide block may be the one that has been conventionally utilized, the one including no power supply element, no guide roller and no guide roller movement mechanism. As the upper and lower guide blocks are located above and below the workpiece (or on the right and left thereof), respectively, it is only the disposition that is different.

First of all, in the case where the wire electrode is connected using an automatic wire-connecting device or the like, the small motors 6a and 6b are subjected to drive control, and the guide rollers 5a and 5b are moved so that central positions thereof are aligned on a line that links the wire guide 2 and the lower guide roller 8, and positioned so that the wire electrode 10 may run linearly, passing the nozzle opening of the machining fluid nozzle 3, the wire guide 2, the guide rollers 5a and 5b, and the lower guide roller 8. At the same time, the movable guide rollers are positioned so that the wire electrode may run linearly also with respect to the upper guide block. Moreover, the wire guides (nozzle openings) of the upper and lower guide blocks are located opposite to each other, and the automatic wire-connecting device is driven to connect the wire electrode 10. A broken line in FIG. 7 indicates a state of the wire electrode 10 at the time of the automatic wire connection, whereas a solid line shows a state thereof at the time of the machining. During the machining, the wire electrode 10 is extended and pulled toward the lower guide roller 8 side, which assures the contact to the contact surface of the power supply element 4.

At the time of the machining, the wire electrode 10 is supplied with power from the power supply element 4. Furthermore, the small motors 6a and 6b are normally/reversely driven, and thus the upper-side and lower-side guide rollers 5a and 5b are moved and oscillated perpendicularly to the running direction of the wire electrode 10 and at the same time in a direction parallel to the contact surface of the power supply element 4 with the wire electrode 10 by using the lead screws 7a and 7b. Consequently, as illustrated in FIGS. 1 and 2, the wire electrode 10 is pressed against the power supply element 4 and supplied with voltage from the power supply element 4. In addition, the upper-side and lower-side guide rollers 5a and 5b are synchronously or asynchronously driven by the small motors 6a and 6b, respectively. In the embodiments shown in FIGS. 1 and 2, the upper-side and lower-side guide rollers 5a and 5b are synchronously driven.

The contact position of the wire electrode 10 on the power supply element 4 is varied, and the wire electrode 10 substantially uniformly contacts the contact surface of the power supply element 4, thus creating no groove or the like, that is attributable to friction against the wire electrode 10, in the flat contact surface of the power supply element 4. Since the movable guide rollers 5a and 5b are affected only by rotational friction, the life of the guide rollers 5a and 5b are lengthened in a large measure. Moreover, the power supply element 4 may be merely fixed by a relatively simple construction, and the structure thereof is therefore uncomplicated. Additionally, when the flat contact surface is abraded due to friction against the wire electrode 10, and the power-supplying state is then deteriorated, the power-supplying state can be easily recovered by pushing the power supply element 4 toward the wire electrode 10 side and fixing the same.

In the aforementioned embodiment, during the discharge machining, the small motors 6a and 6b are driven to oscillate the upper-side and lower-side guide rollers 5a and 5b. During the discharge machining, however, the guide rollers 5a and 5b may be moved only in a given pitch by driving the small motors 6a and 6b on a regular basis or in a random order, instead of moving the guide rollers 5a and 5b on a steady basis, thereby varying the contact position of the wire electrode 10 on the power supply element 4.

Although, in the above-mentioned embodiment, there are provided the small motors 6a and 6b for moving the upper-side and lower-side guide rollers 5a and 5b, respectively, it is possible to provide a small motor to either of the guide rollers and to drive the lead screw of the other guide roller by using drive transmission means, such as a gear, belt and the like, thereby driving the two lead screws 7a and 7b by using one motor.

Although, in the aforementioned embodiment, the guide rollers 5a and 5b for moving the wire electrode 10 along the flat contact surface of the power supply element 4 are located above and below the power supply element 4, respectively, the guide rollers 5a and 5b may be located only at one side of the power supply element 4 instead of being disposed above and below the power supply element 4.

Figure 3:
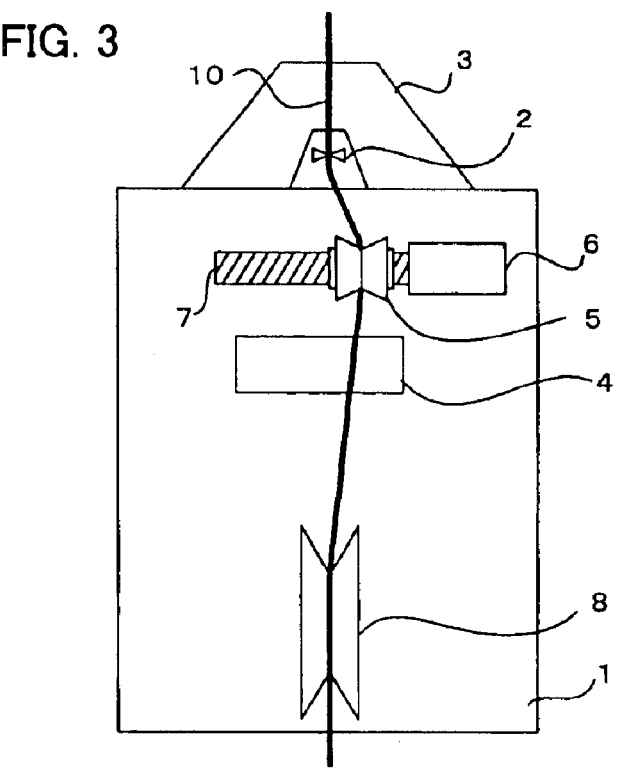
FIG. 3 is a schematic diagram showing a lower wire guide portion according to a second embodiment of the present invention.

FIG. 3 is a schematic view of a lower guide block 1 according to a second embodiment in which a guide roller 5 is disposed only above a power supply element 4. Members identical to those in the first embodiment shown in FIG. 1 are provided with the same reference numerals. In the second embodiment, the guide roller 5 driven by a small motor 6 through a lead screw 7 is disposed above the power supply element 4, and a wire electrode 10 is simply moved along the flat contact surface of the power supply element 4 by the guide roller 5. In this case, the guide roller S located above the power supply element 4 and the power supply element 4 are disposed close to each other, thus greatening a range of variation of the contact position of the wire electrode 10 on the power supply element 4, the variation being caused by the movement of the movable guide roller 5. This enlarges an area of the power supply element 4, that is abraded due to contact with the wire electrode 10, resulting in prolongation of the life of the power supply element 4.

Figure 4:
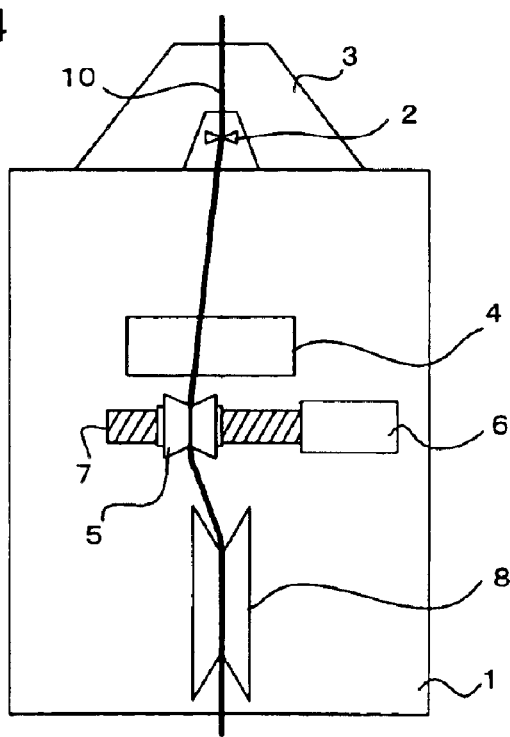
FIG. 4 is a schematic diagram showing a lower wire guide portion according to a third embodiment of the present invention.

FIG. 4 is a schematic view of a lower guide block 1 of a third embodiment in which a guide roller S driven by a small motor 6 through a lead screw 7 is located below a power supply element 4. In this embodiment, the variation range of the contact position of a wire electrode 10 on the power supply element 4 is widened by disposing the power supply element 4 and the guide roller 5 located below the power supply element 4 close to each other. Thus, the life of the power supply element 4 is extended.

As illustrated in FIGS. 5a–5d, the movable guide rollers 5, 5a and 5b in each embodiment have respective portions that guide the wire electrode 10, that are formed into the shape of V as shown in FIG. 5a, the shape of a curved concave as shown in FIG. 5b, the shape of a saucer-shaped concave as shown in FIG. 5c, the shape of a concave with both sides standing upright as shown in FIG. 5d, or the like. The shapes of the guide rollers would be adequate as long as they enable the wire electrode 10 to move in a direction perpendicular to the running direction thereof and are able to guide the running of the wire electrode 10.

The power supply element 4 has only to have a flat surface that is brought into contact with the wire electrode 10, and may be formed into a flat plate shown in FIGS. 6a–6c, resulting in reduction of the manufacturing cost of the power supply element 4.

Figure 8:
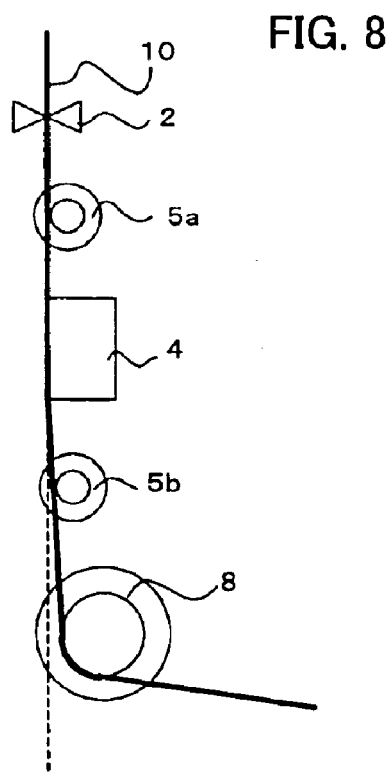
FIG. 8 is a schematic diagram showing another positional relation of the upper and lower wire guides and the power supply element with respect to, the wire electrode.

In each of the above-described embodiments, as illustrated in FIG. 7, guide positions at which the upper-side and lower-side guide rollers 5a and 5b guide the wire electrode 10 are located opposite to the contact surface of the power supply element 4 with respect to the wire electrode. As illustrated in FIG. 8, however, the guide positions of the upper-side and lower-side guide rollers 5a and 5b, that guide the wire electrode 10 and the contact surface of the power supply element 4 with the wire electrode 10 are located on the same side with respect to the wire electrode 10. In this case as well, the wire electrode 10 is connected in a state shown by the broken line at the time of the automatic wire connection. At the time of the machining, however, the wire electrode 10 is extended and pulled toward the lower guide roller 8 side, and is thus brought into contact with the contact surface of the power supply element 4 as shown in the solid line.

Especially in cases where the guide roller 5 is disposed only above the power supply element 4 as in the embodiment illustrated in FIG. 3, the guide position of the guide roller 5, that guides the wire electrode 10, and the contact surface of the power supply element 4 are preferably located opposite to each other (located in the form illustrated in FIG. 7).

The present invention is capable of prolonging the life of the power supply element in a large measure with a simple structure since the consumable power supply element has the variable contact position contacting the wire electrode and the contact area that can be enlarged. Furthermore, since the power supply element also has a simple structure formed into a flat plate, the manufacturing cost thereof is lowered, which enables the reduction of both the manufacturing cost and the running cost.

What is claimed is:

1. A wire electric discharge machining apparatus for machining a workpiece with electric discharge generated by applying voltage between a wire electrode and the workpiece, comprising:
   a power supply element for supplying the voltage to the wire electrode by contact with the wire electrode;
   a guide roller for supporting the wire electrode arranged at one side of said power supply element with respect to a running direction of the wire electrode; and
   a guide roller moving mechanism for moving said guide roller in a direction substantially perpendicular to the running direction of the wire electrode so that position of the contact of said power supply element with the wire electrode is changed.

2. A wire electric discharge machining apparatus for machining a workpiece with electric discharge generated by applying voltage between a wire electrode and the workpiece, comprising:
   a power supply element for supplying the voltage to the wire electrode by contact with the wire electrode;
   guide rollers for supporting the wire electrode respectively arranged at both sides of said power supply element with respect to a running direction of the wire electrode; and
   at least one guide roller moving mechanism for moving said guide rollers in a direction substantially perpendicular to the running direction of the wire electrode so that position of the contact of said power supply element with the wire electrode is changed.

* * * * *

UNITED STATES PATENT AND TRADEMARK OFFICE
CERTIFICATE OF CORRECTION

PATENT NO. : 6,855,904 B2
DATED : February 15, 2005
INVENTOR(S) : Yoshiharu Inaba et al.

It is certified that error appears in the above-identified patent and that said Letters Patent is hereby corrected as shown below:

<u>Title page,</u>
Item [73], Assignee, should be in caps -- FANUC --.
Item [56], References Cited, FOREIGN PATENT DOCUMENTS,
change "JP 4-42420" to -- JP5-42420 --.

<u>Column 2,</u>
Line 39, change "diagram" to -- diagrams --.
Line 46, remove ",".

<u>Column 3,</u>
Line 10, delete "paragraph return" after "in".

<u>Column 4,</u>
Lines 55 and 66, change "S" to -- 5 --.

Signed and Sealed this

Thirtieth Day of August, 2005

JON W. DUDAS
*Director of the United States Patent and Trademark Office*